(12) United States Patent
Barry et al.

(10) Patent No.: US 6,396,052 B1
(45) Date of Patent: May 28, 2002

(54) HIGH PRECISION ANALOG ENCODER SYSTEM

(75) Inventors: Raymond Jay Barry; Todd Alan Dutton, both of Lexington; Steven Andrew Rice, Shelbyville, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/543,672

(22) Filed: Apr. 7, 2000

(51) Int. Cl.⁷ .................................................. G01D 5/34

(52) U.S. Cl. ........................... 250/231.13; 250/231.16; 250/231.18

(58) Field of Search ..................... 250/231.13, 231.16, 250/231.18; 341/13, 11

(56) References Cited

U.S. PATENT DOCUMENTS

| | | | |
|---|---|---|---|
| 3,573,806 A | 4/1971 | Klein | |
| 3,754,239 A | 8/1973 | Hosemann | |
| 3,976,997 A | 8/1976 | Hafle | |
| 4,039,948 A | 8/1977 | Boxall | |
| 4,060,907 A | 12/1977 | Van Hook | |
| 4,259,570 A | 3/1981 | Leonard | |
| 4,263,506 A | 4/1981 | Epstein | |
| 4,266,125 A | 5/1981 | Epstein et al. | |
| 4,346,447 A | 8/1982 | Takahama | |
| 4,429,267 A | 1/1984 | Veale | |
| 4,476,420 A | 10/1984 | Asakawa | |
| 4,476,457 A | 10/1984 | Kondo | |
| 4,496,936 A | 1/1985 | Kramer | |
| 4,567,462 A | 1/1986 | Leiby | |
| 4,587,513 A | 5/1986 | Burrowes et al. | |
| 4,588,936 A | 5/1986 | Itoh et al. | |
| 4,588,982 A | 5/1986 | Goodwin | |
| 4,593,194 A | 6/1986 | Graham et al. | |
| 4,607,956 A | 8/1986 | Ishihara et al. | |
| 4,611,269 A | 9/1986 | Suzuki et al. | |
| 4,621,224 A | 11/1986 | Watabe et al. | |
| 4,621,256 A | 11/1986 | Rusk | |
| 4,633,224 A | 12/1986 | Gipp et al. | |
| 4,654,636 A | 3/1987 | Rusk | |
| 4,678,910 A | 7/1987 | Hara et al. | |
| 4,691,101 A | 9/1987 | Leonard | |
| 4,697,125 A | 9/1987 | Goff et al. | |
| 4,780,703 A | 10/1988 | Ishida et al. | |
| 4,786,891 A | 11/1988 | Ueda et al. | |
| 4,788,422 A | 11/1988 | Fujiwara | |
| 4,833,316 A | 5/1989 | Yoneda | |
| 4,849,624 A | 7/1989 | Huggins | |
| 4,851,840 A | 7/1989 | McAulay | |
| 4,920,259 A | 4/1990 | Epstein | |
| 4,922,175 A | 5/1990 | Sugiura et al. | |
| 4,933,673 A | 6/1990 | Ishizuka et al. | |
| 4,952,799 A | 8/1990 | Loewen | |
| 4,964,727 A | 10/1990 | Huggins | |
| 4,970,511 A | 11/1990 | Mills | |
| 4,972,080 A | 11/1990 | Taniguchi | |
| 4,975,569 A | 12/1990 | Ebina et al. | |

(List continued on next page.)

Primary Examiner—Robert H. Kim
Assistant Examiner—Courtney Thomas
(74) Attorney, Agent, or Firm—Taylor & Aust, P.C.

(57) ABSTRACT

A method of determining a feed position of a print medium in an imaging apparatus includes an encoder device, connected to a feed shaft, that produces a first periodic signal and a second periodic signal approximately 90 degrees out of phase with the first. A modified first signal is created. A modified second signal is created. The modified first signal is added to the modified second signal to create a summation signal that has a plurality of local minimum values, a plurality of local maximum values, and a plurality of substantially linear segments. A periodic modified summation signal is created by adding a corresponding constant value to each linear segment. The feed position of the print medium is calculated based upon a number of cycles of the modified summation signal counted and a determined value of the modified summation signals.

20 Claims, 15 Drawing Sheets

U.S. PATENT DOCUMENTS

| | | |
|---|---|---|
| 4,990,767 A | 2/1991 | Ernst et al. |
| 4,992,716 A | 2/1991 | Ellis |
| 4,998,105 A | 3/1991 | Takekoshi et al. |
| 5,003,171 A | 3/1991 | Paley |
| 5,012,238 A | 4/1991 | Hayashi et al. |
| 5,013,910 A | 5/1991 | Epstein |
| 5,021,650 A | 6/1991 | Rieder et al. |
| 5,021,781 A | 6/1991 | Salazar et al. |
| 5,041,829 A | 8/1991 | Garrett |
| 5,120,954 A | 6/1992 | Taniguchi |
| 5,121,230 A | 6/1992 | Honma et al. |
| 5,126,736 A | 6/1992 | Okutani |
| 5,148,020 A | 9/1992 | Machida |
| 5,231,596 A | 7/1993 | Nakazawa et al. |
| 5,241,172 A | 8/1993 | Lugaresi |
| 5,262,873 A | 11/1993 | Ishizuka |
| 5,438,330 A | 8/1995 | Yamazaki et al. |
| 5,448,060 A | 9/1995 | Orton |
| 5,483,059 A | 1/1996 | Igaki et al. |
| 5,493,300 A | 2/1996 | Eiler et al. |
| 5,506,579 A | 4/1996 | Spaulding |
| 5,557,450 A | 9/1996 | Sun |
| 5,596,189 A | 1/1997 | Orton |
| 5,596,427 A | 1/1997 | Honma et al. |
| 5,598,201 A | 1/1997 | Stodder et al. |
| 5,610,491 A | 3/1997 | Gotz et al. |
| 5,644,127 A | 7/1997 | Ohmae |
| 5,748,335 A | 5/1998 | Honma et al. |
| 5,763,874 A | 6/1998 | Luciano et al. |
| 5,774,074 A | 6/1998 | Cooper et al. |
| 5,825,307 A | 10/1998 | Titus et al. |
| 5,837,999 A | 11/1998 | Horiuchi |
| 5,844,814 A | 12/1998 | Chliwnyi et al. |

Fig. 10

| Signal A | Signal B | Direction |
|---|---|---|
| Rising edge | Low | 1 |
| Falling edge | High | 1 |
| High | Rising edge | 1 |
| Low | Falling edge | 1 |
| Rising edge | High | 0 |
| Falling edge | Low | 0 |
| Low | Rising edge | 0 |
| High | Falling edge | 0 |

Table 1

HIGH PRECISION ANALOG ENCODER SYSTEM

BACKGROUND OF THE INVENTION

1. Field of the Invention

The present invention relates to ink jet printers, and, more particularly, to a paper position sensing system for an ink jet printer.

2. Description of the Related Art

With printers which use a columnar array of print elements or nozzles, a typical mode of operation requires that the column of nozzles be swept horizontally across the paper while the nozzles are selectively fired according to points in a bitmap which represent printed pixels. At the end of such a swath, the paper is indexed vertically by the height of the printhead and the printhead is again swiped across the paper. With this process, there are inherent print defects introduced by such things as paper feed inaccuracies and nozzle-to-nozzle variations in drop size or placement.

Studies of inkjet printer print quality indicate that the paper positioning system must be able to control the location of the paper within 4 micrometers to eliminate paper positioning artifacts in single pass printing. A control system capable of this resolution requires a position sensor with resolution in the sub-micrometer range. Conventional digital encoders, the usual sensor for this type of control system, are not capable of achieving resolution this fine.

An optical encoder 10 (FIG. 1) includes a light source 22, a code wheel 24, a light detector 26, an optical mask 28 and a rotating shaft 30. Mask 28 discerns the spatial location of the shadows produced by code wheel 24. Another method of discernment is to carefully control the size and location of light detectors 26 relative to the lines and windows of code wheel 24.

Code wheel 24 is mostly translucent with a series of opaque radial lines 32 near the periphery. Code wheel 24 is attached to rotating shaft 30. The stationary mask 28 has a matching set of opaque lines 34. Light from source 22 passes through the translucent portions of code wheel 24 and then through the translucent portions of mask 28, eventually falling upon detector 26. The amount of light falling upon detector 26 depends upon the alignment of the translucent portions of code wheel 24 to the translucent portions of mask 28. When the translucent portions of code wheel 24 align with opaque portions 34 of mask 28, light is blocked from detector 26. When the translucent portions of code wheel 24 align with the translucent portions of mask 28, light passes through to detector 26. The amount of light falling on detector 26 is a direct indication of the location of code wheel 24 relative to mask 28. The output of light detector 26 is a periodic function of the rotational angle of code wheel 24 and might look like the waveform shown in FIG. 2. It is to be understood that the term "rotational angle" may also be referred to herein as "angular displacement", "rotational position", or "angular position".

Position changes can be coarsely tracked by counting the number of cycles traversed. Finer resolution can be obtained by observing the level of the output of detector 26 within each cycle. If the output of detector 26 were an ideal triangle wave, the entire fine resolution portion of the position measurement could be accomplished with one encoder channel. With current technology, this is not a realistic expectation. There is also some ambiguity with just one channel since two different positions within each cycle produce the same output magnitude. This ambiguity is overcome by a two channel encoder 36 (FIG. 3) including a second mask 29 and a second light detector 40 which are aligned with respect to the first mask 28 and light detector 26 so as to produce a signal that is 90 electrical degrees out of phase with the first signal shown in FIG. 4. The phase relationship of these two signals also helps determine direction of motion. Optionally, a second light source 38 in alignment with the second mask 29 and second light detector 40 may be included.

A two channel encoder is useful in tracking relative position changes of a rotating shaft. In the case where the absolute position of the shaft is required, an additional reference mark is needed. This is commonly accomplished by adding a third channel called the index channel with an associated light source 43 and index light detector 42 (FIG. 5). A single mark 44 detectable by optical sensor 42 is added to code wheel 24. A pulse occurs on the index channel once per revolution of code wheel 24 as index mark 44 passes sensor 42 thus indicating the absolute position of shaft 30.

Historically, most optical encoders have provided digital outputs. This is accomplished by "squaring up" the light detector outputs as shown in FIG. 6. Not "squaring up" the sensor signals, but instead processing them while they are still in their analog form can produce higher resolution.

In summary, given an optical encoder with two quadrature analog outputs and an index signal, absolute position is determined in the following manner. First, index mark 44 is found. The encoder is advanced until a pulse is seen on the index channel. Upon seeing this pulse, a count is started to keep track of the number of cycles of either channel A or channel B that have been traversed. In between discrete cycle counts, fine position resolution is achieved by examining the strength of the signals on both channels A and B.

What is needed in the art is a method and apparatus for converting the outputs from an analog position encoder into high precision, digital position data.

SUMMARY OF THE INVENTION

The present invention provides a high precision analog encoder system which uses the same basic optical sensor employed by other digital encoders but achieves hundreds of times the resolution.

The invention comprises, in one form thereof, a method of determining a feed position of a print medium in an imaging apparatus. A feed roll with a central feed shaft carries the print medium such that a rotational position of the feed shaft has a predetermined relationship with the feed position of the print medium. An encoder device, connected to the feed shaft, produces a first periodic signal and a second periodic signal approximately 90 degrees out of phase with the first. Each periodic signal is a function of the rotational position of the feed shaft. Each period of each signal corresponds to a predetermined rotational distance of the feed shaft. A modified first signal is created. The slope of the modified first signal has the same sign at each rotational position of the feed shaft. The magnitude of the slope of the modified first signal is equal to the magnitude of the slope of the unmodified first signal at each rotational position of the feed shaft. A modified second signal is created. The slope of the modified second signal has the same sign at each rotational position of the feed shaft. The magnitude of the slope of the modified second signal is equal to the magnitude of the slope of the unmodified second signal at each rotational position of the feed shaft. The modified first signal is added to the modified second signal to thereby create a summation signal. The summation signal has a plurality of local minimum values, a plurality of local maximum values, and a plurality of substantially linear segments. Each linear segment interconnects a corresponding local minimum value with an adjacent local maximum value. A periodic modified summation signal is created by adding a corresponding constant value to each linear segment to thereby create a plurality of shifted linear segments such that each shifted linear segment extends between a substantially equal minimum value and a substantially equal maximum value. Each shifted linear segment represents one cycle of the periodic modified summation signal. A number of completed cycles of the modified summation signal are counted. A value of the modified summation signal at a selected point in time is determined. The feed position of the print medium is calculated based upon the number of cycles counted and the determined value of the modified summation signal.

An advantage of the present invention is that the rotational position of a shaft can be precisely determined with a simple, robust system that is well adapted to high volume manufacturing.

Another advantage is that the system of the present invention can be used with an optical encoder whose output is non-sinusoidal.

Yet another advantage is that amplitude variations between channels, between encoders, and over time are automatically compensated for.

A further advantage is that the present invention needs neither a division operation to compute a tangent, nor a means of computing an arctangent, such as a look-up table, as are required by known optical encoder systems.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 10 is a table of the relationship between the states of channels A and B of FIG. 7 and the direction of rotation of the code wheel of FIG. 5;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

The present invention provides a system 50 (FIG. 7) for converting the outputs of analog encoder 58 on signal paths 52, 54 and 56 into high-resolution digital position data. System 50 includes some analog and digital circuitry, digital-to-analog converters, and a microprocessor 60 with a microprocessor program.

Figure 7:
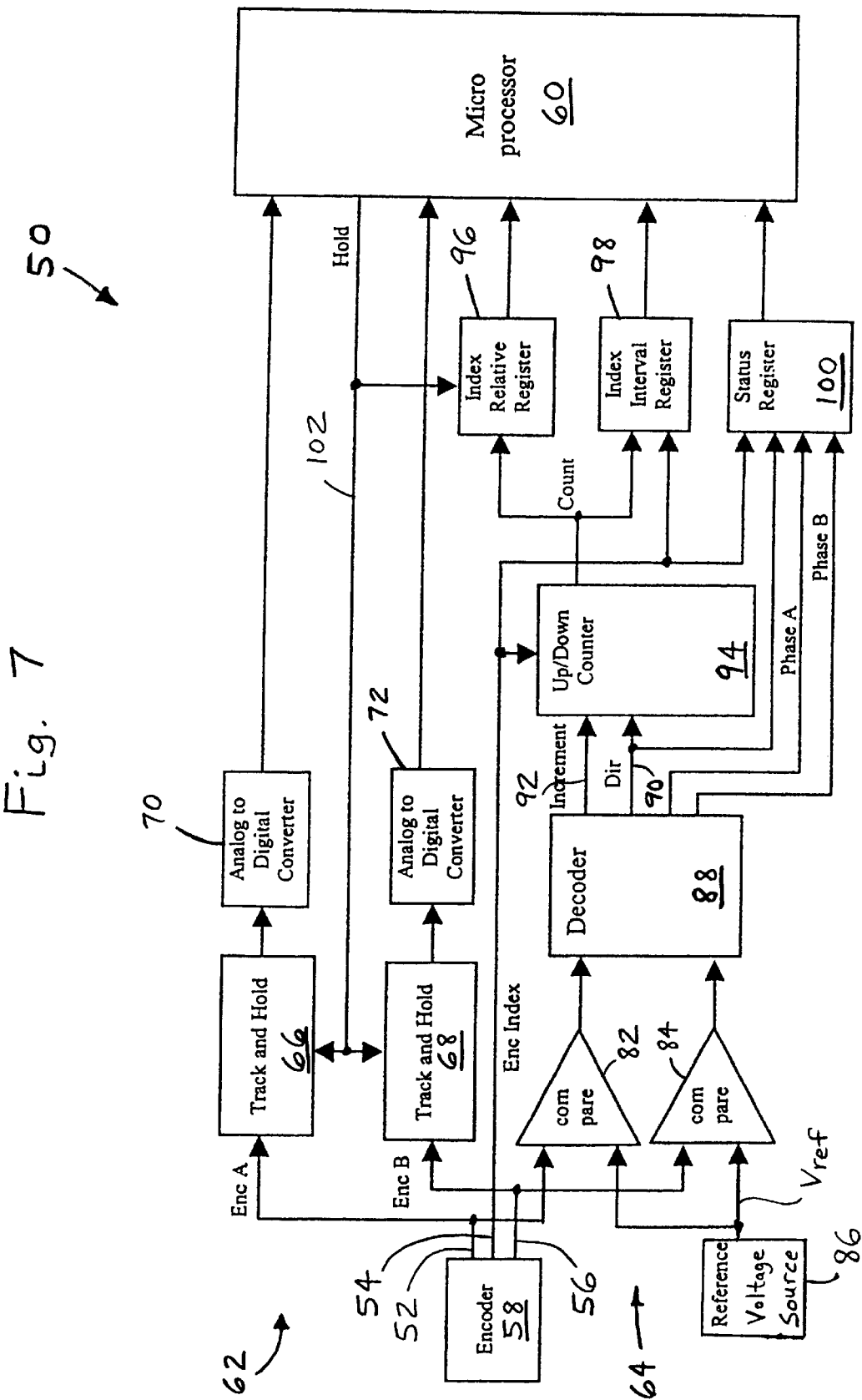
FIG. 7 is a block diagram of one embodiment of an encoder system of the present invention.

There are two distinct paths for the encoder signals in this system: an analog path 62 and a digital path 64. The top half of the block diagram of FIG. 7 shows the analog path 62 where the encoder signals Enc A and Enc B on signal paths 52 and 56, respectively, are sampled with respective track and holds 66, 68 and then digitized by respective analog-to-digital converters 70, 72 for use by microprocessor 60. Encoder signals Enc A and Enc B are periodic signals having a waveform corresponding generally to the normalized waveforms shown in FIG. 11.

Figure 8:
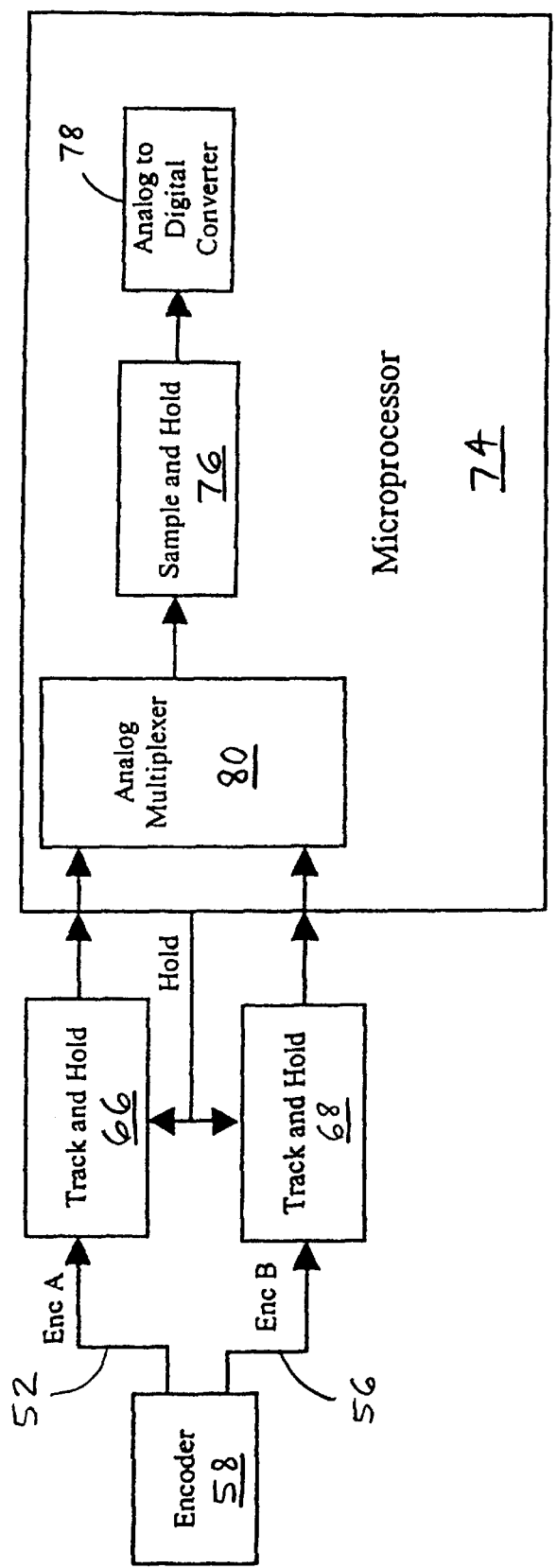
FIG. 8 is a block diagram of another embodiment of the analog path of FIG. 7.

In another embodiment, a microprocessor 74 (FIG. 8) has an internal sample and hold circuit 76 and an analog-to-digital converter 78. Both encoder signals Enc A and Enc B must be sampled at the same instant in time. Since microprocessor 74 samples the signals sequentially rather than simultaneously, external track and holds 66, 68, which can operate simultaneously, are required. The outputs of the external track hold circuits 66, 68 go to an internal analog multiplexer 80 in processor 74, then to the processor's sample and hold 76, and finally to the processor's analog-to-digital converter 78.

Figure 6:
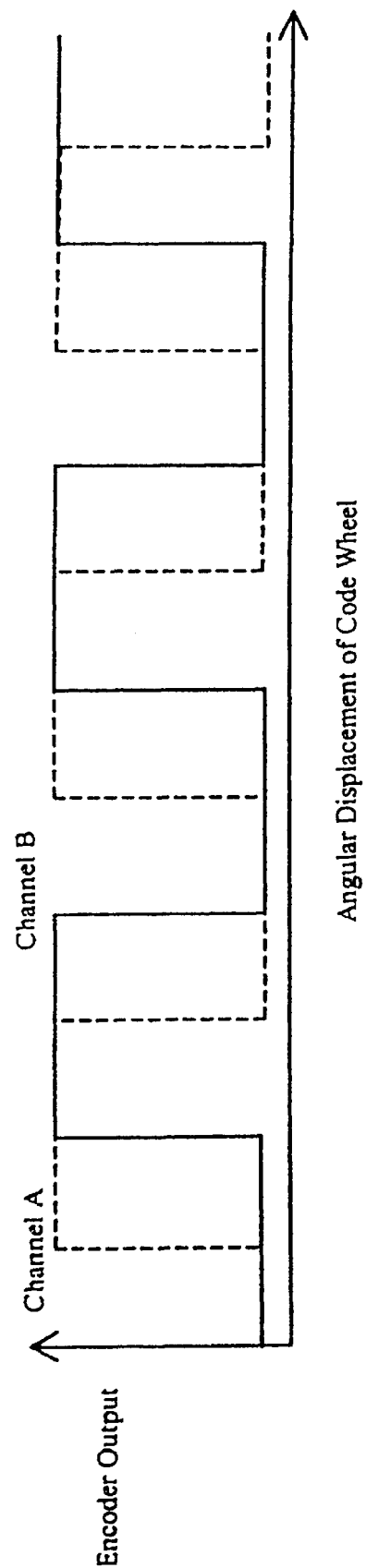
FIG. 6 is a plot of a digitized version of the outputs of the detectors of FIG. 3.
Figure 9:
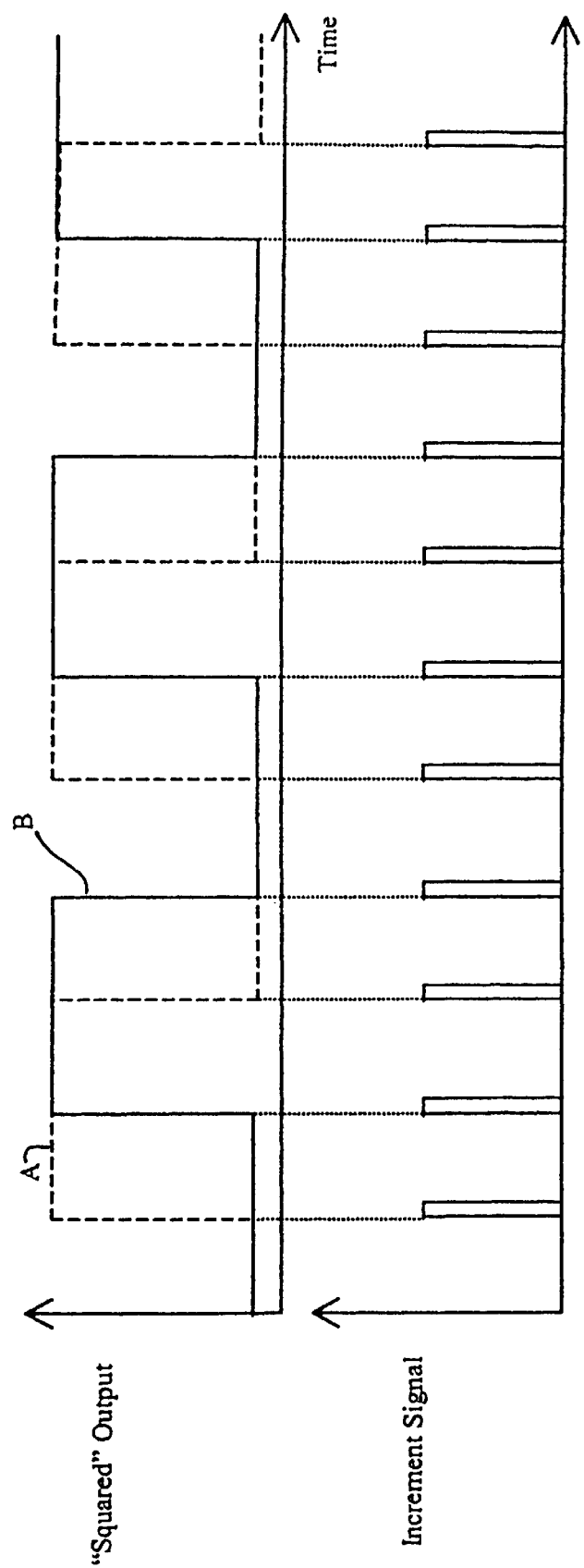
FIG. 9 is a plot of the outputs of the comparators and the increment signal of FIG. 7.

The bottom half of FIG. 7 shows digital path 64. Digital path 64 is more complicated than analog path 62, but most of digital path 64 is easily implemented in a custom integrated circuit. The analog encoder signals Enc A, Enc B present at signal paths 52, 56, respectively, are first passed through respective comparators 82, 84 to turn them into digital signals that look like the signals in FIG. 6. Comparators 82, 84 compare respective analog inputs Enc A, Enc B with a fixed voltage $V_{ref}$ output by reference voltage source 86. $V_{ref}$ is set to the center (i.e., 0.5(min+max)) of the voltage of encoder signals Enc A, Enc B. When the voltage of the corresponding one of signals Enc A, Enc B is greater than the voltage $V_{ref}$ of reference voltage source 86, then the output of the corresponding one of comparators 82, 84 takes one logic level, as shown in FIG. 9, to form one of squared output signals A, B. Conversely, when the voltage of the corresponding one of signals Enc A, Enc B is below $V_{ref}$, then the output of the corresponding one of comparators 82, 84 takes the opposite logic level. The particular logic level is not important. However, in the embodiment shown, the logic level is "1" when the corresponding one of signals Enc A, Enc B is above $V_{ref}$, and the logic level is "0" when the corresponding one of signals Enc A, Enc B is below $V_{ref}$.

Following conversion to digital levels by comparators 82, 84, a digital state machine or "decoder" 88 processes the digital signals and produces a direction signal and an increment signal on signal paths 90 and 92, respectively. The direction signal and the increment signal control an up/down counter 94. The increment signal pulses every time a logic transition occurs on either squared output signal A or squared output signal B as shown in FIG. 9, with some exceptions. The exception occurs following direction reversals. Decoder state machine 88 does not produce an increment pulse at the same encoder location as the previous pulse. This feature prevents rapid oscillations about an encoder transition point from out-running counter 94, and is required by the behavior of the direction signal, as described below.

Direction is determined by observing the relative phases of squared output signals A and B. Table 1 (FIG. 10) shows how direction is determined from the relationship between squared output signals A and B.

Up/down counter 94 counts encoder events, such as the rising and falling edges on each of squared output signals A and B. There are two such encoder events per cycle on each channel, so counter 94 counts four pulses per encoder cycle. This is referred to as the "quadrant count." Counter 94 counts up when the direction is 1 and down when the direction is 0.

Figure 1:
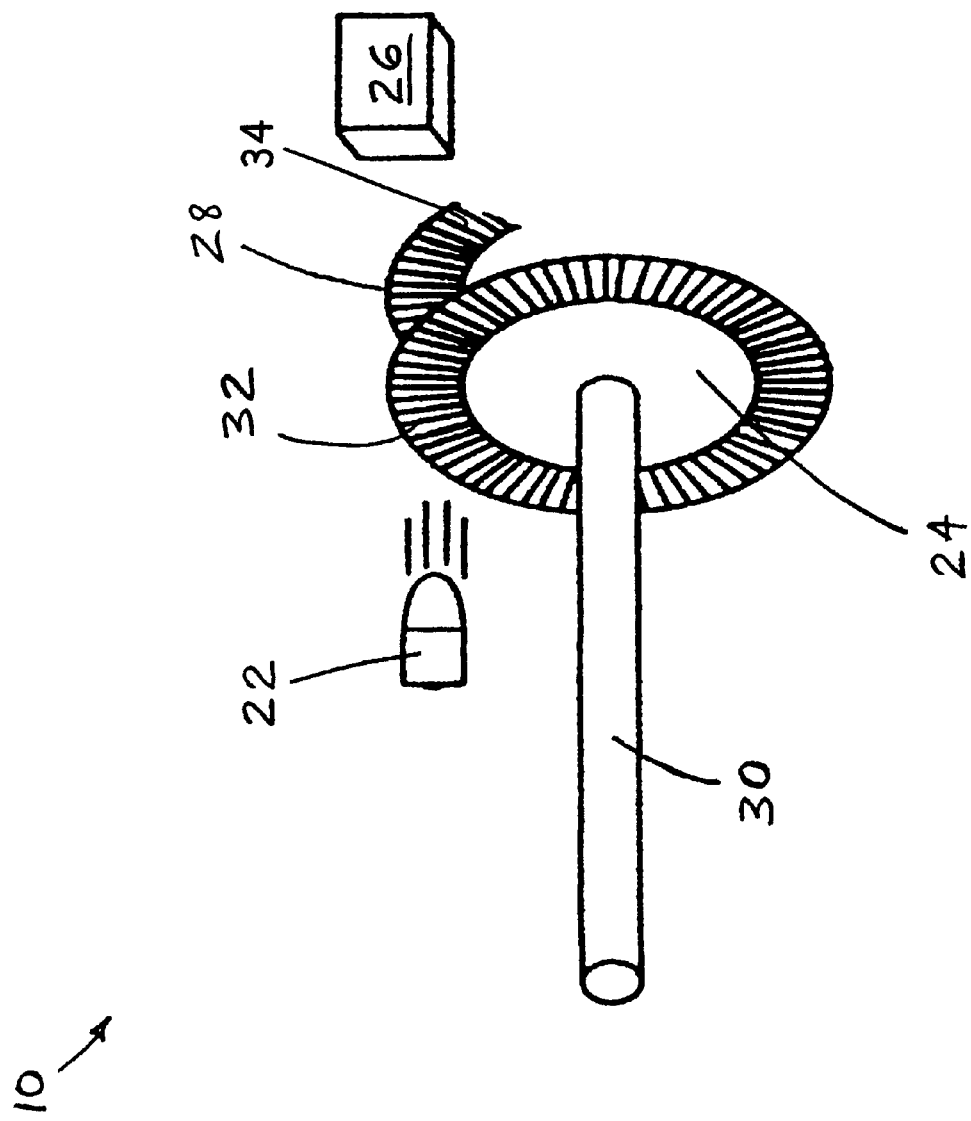
FIG. 1 is a schematic, perspective view of a known encoder with an optical mask.
Figure 2:
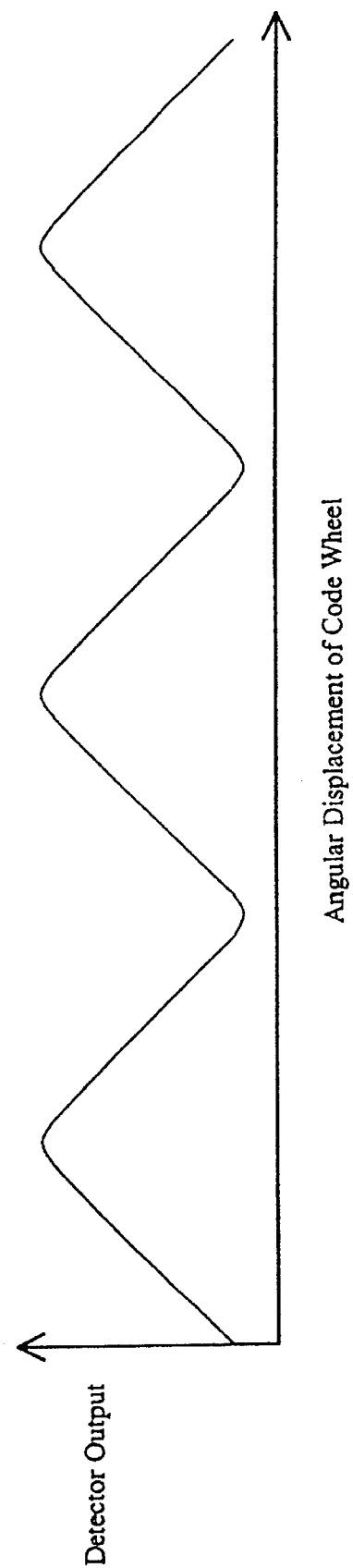
FIG. 2 is a plot of the output of the detector of the encoder of FIG. 1 versus the position of the code wheel.
Figure 3:
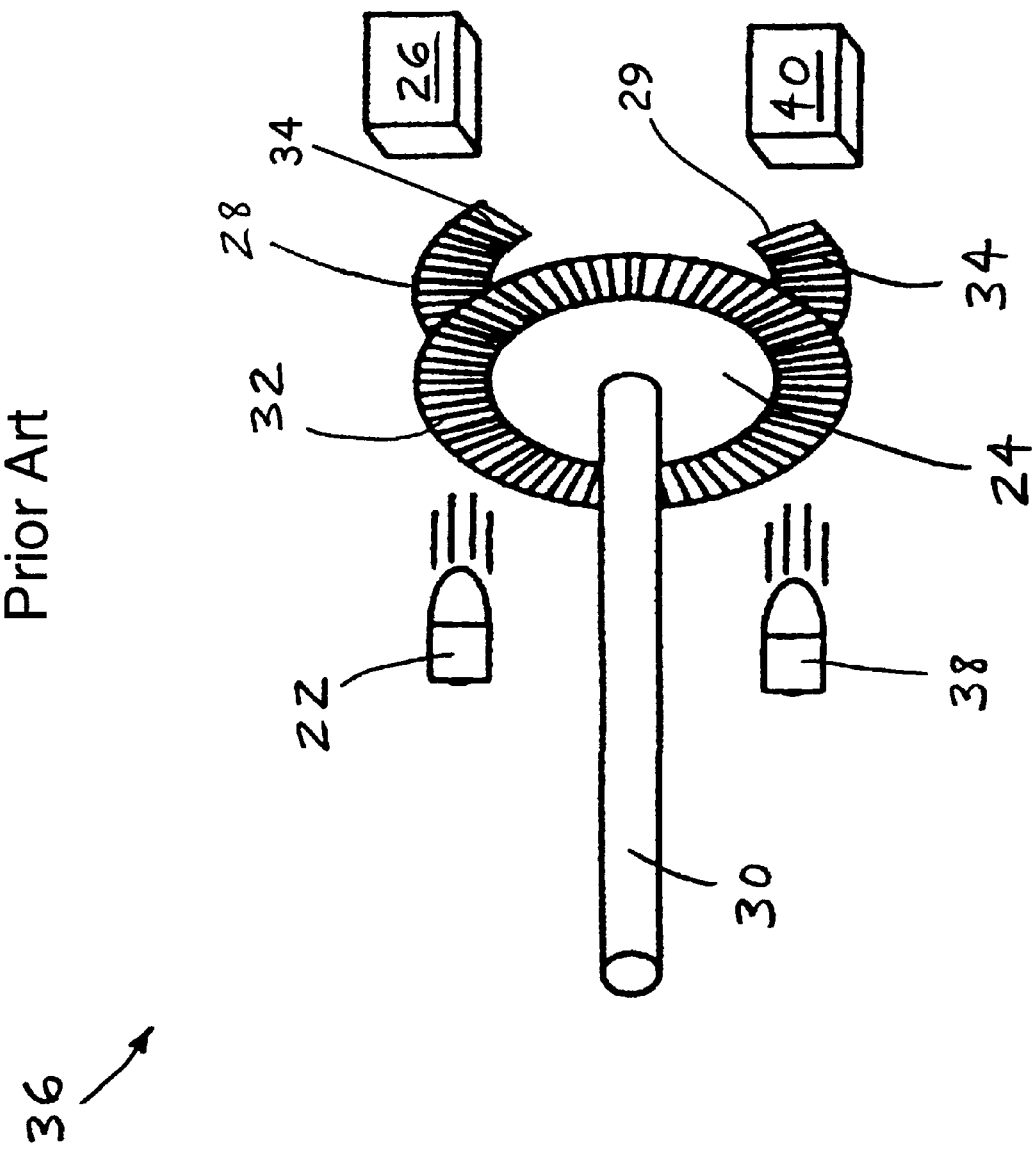
FIG. 3 is a schematic, perspective view of a known two channel encoder.
Figure 4:
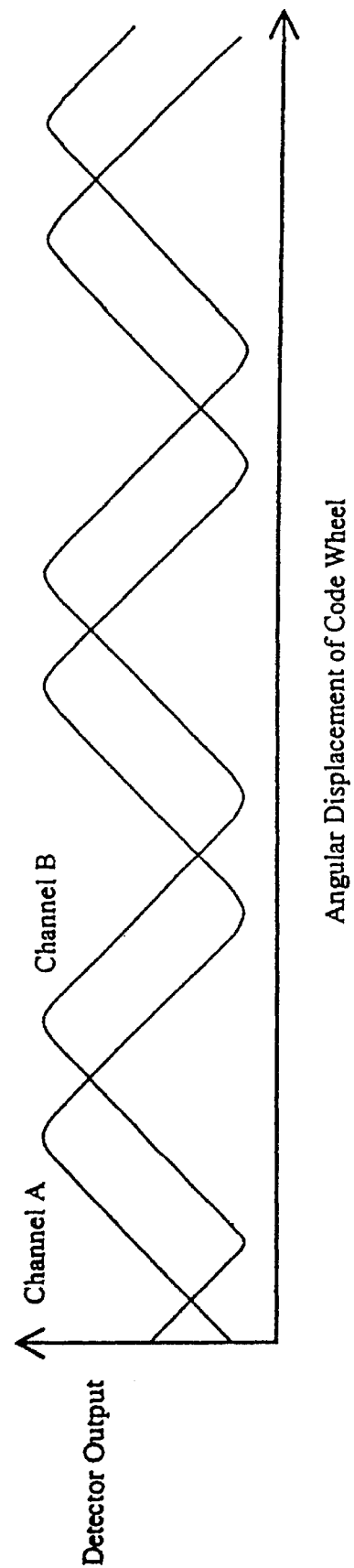
FIG. 4 is a plot of the output of the detectors of the encoder of FIG. 3 versus the position of the code wheel.
Figure 5:
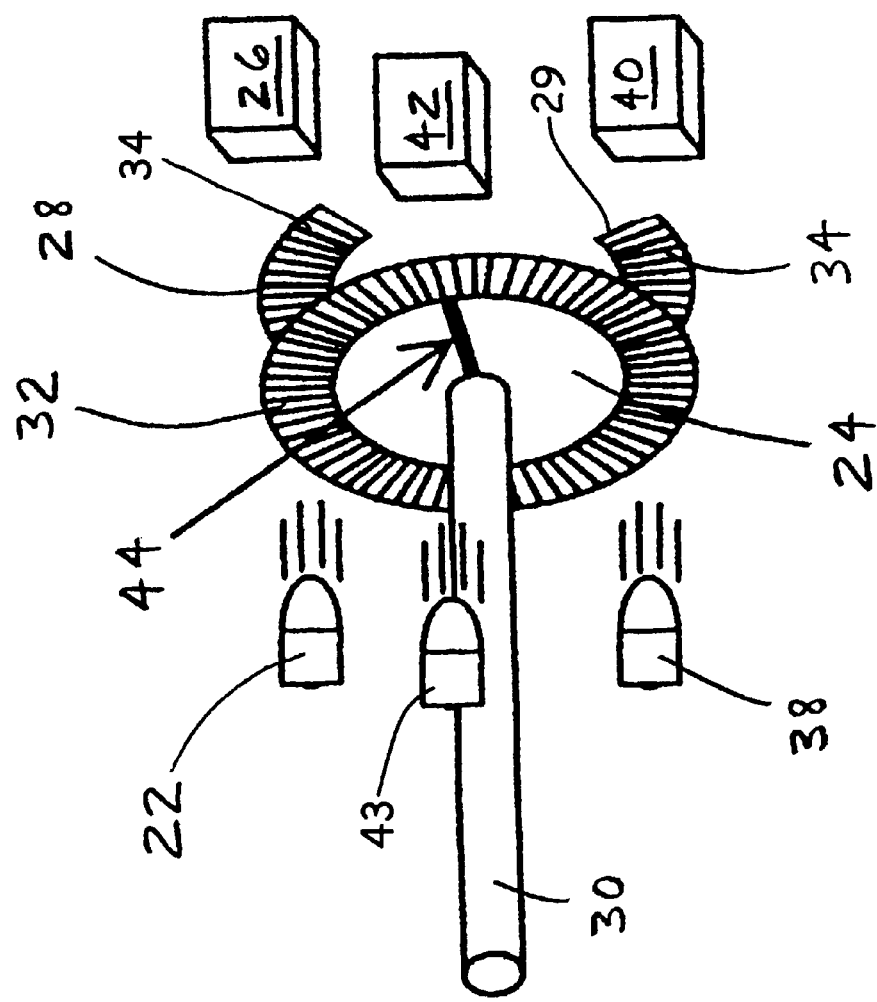
FIG. 5 is a schematic, perspective view of a known three channel encoder.

Counter 94 is reset to zero by the encoder index signal on signal path 54. It is possible for counter 94 to be reset by either transition of the index signal. In the present embodiment, however, it is the trailing transition of the index pulse on signal path 54 which causes the reset, which thereby builds some hysteresis into the index signal. As a result, counter 94 contains the current location of code wheel 24, as measured in encoder quadrants relative to index mark 44 on wheel 24 (FIG. 5).

This count is captured in two registers 96 and 98. Register 96 captures the count at the instant that analog signals Enc A, Enc B are sampled and is used in conjunction with analog signals Enc A, Enc B to determine the position of wheel 24 at the instant of sampling. Register 96 is referred to as the "index relative register" because its count is relative to the last index pulse on signal path 54. Register 98 captures the count just prior to counter 94 getting reset by the index signal on signal path 54. This indicates the exact count for the previous revolution of code wheel 24. Register 98 is referred to as the "index interval register" because it contains the count of the interval between the last two index pulses. This is needed to compensate for possible inconsistency in the occurrence of the transition of the index signal on path 54 relative to the signals on paths 52 and 56. Temperature changes, aging optics, or electrical noise can change the relationship of the index pulse on path 54 to the signals on paths 52 and 56.

A status register 100 captures the state of both squared output signals A and B and the direction signal on signal path 90 that correspond to the current count for use in interpreting analog signals Enc A, Enc B. Status register 100 also contains a flag indicating whether the index signal on path 54 has reset counter 94 since index interval register 98 was last read.

With this hardware in place, the information for processor 60 to calculate position to a high degree of accuracy is available. However, the calculation is a fairly complex and non-intuitive process.

As analog signals Enc A, Enc B arrive at track and hold circuits 66, 68 they are assumed to be in quadrature (have a phase separation of 90 electrical degrees). Quadrature errors negatively impact the accuracy of the position calculation. The signals Enc A and Enc B on paths 52 and 56, respectively, are not assumed to have the same amplitude. In fact, the only assumption about their amplitudes is that they are in some reasonable range. Microprocessor 60 normalizes the amplitudes of signals Enc A, Enc B in the course of calculating position.

An analog-to-digital converter, such as analog-to-digital converter 78, can have ten bits of resolution. In order to simplify calculations, the digitized signals can be truncated to eight bits. However, the number of bits of resolution can be chosen to accommodate the specific application.

The calculation of position, from the viewpoint of processor 60, includes setting a "hold" signal on signal path 102 to capture the digital count and analog signals Enc A, Enc B.

An analog-to-digital conversion is performed on analog signals Enc A, Enc B by analog-to-digital converters 70, 72. The resulting digitized input is then to be converted to an eight-bit number by microprocessor 60.

Figure 11:
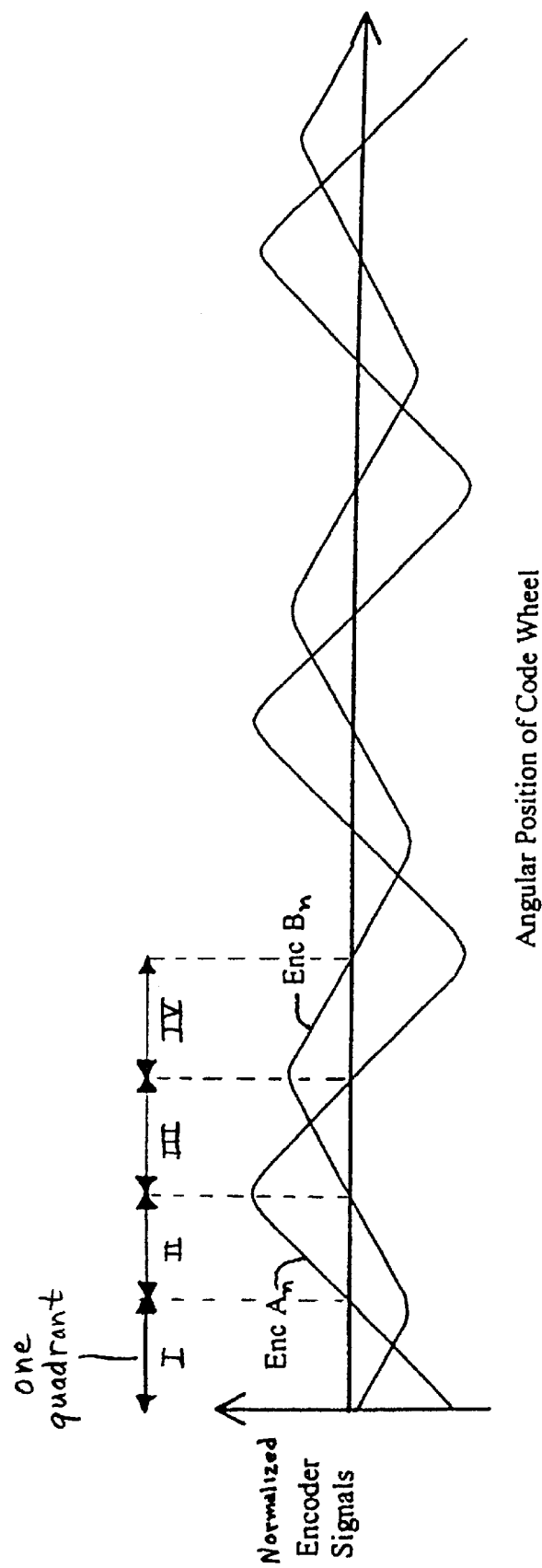
FIG. 11 is a plot of normalized versions of the encoder signals carried by channels A and B of FIG. 7 versus the angular position of the code wheel of FIG. 5.

The amplitudes of analog signals Enc A, Enc B are expected to be different. Also, the amplitudes are expected to vary from machine to machine, with temperature and with time. Therefore, a normalization operation is required on the digitized versions of each of signals Enc A, Enc B in order to make sure that the final position signal covers the desired eight-bit range from the beginning of a quadrant to the end. In other words, the signal should range from 0 at the beginning of a quadrant to its maximum value at the end of the quadrant. The following normalization formula is applied to each of the two digitized signals:

$$\text{Normalized signal}=127(\text{actual signal value-midpoint})/(\text{amplitude A+amplitude B})$$

wherein "midpoint" is defined as a value half way between the maximum and minimum values for that digitized signal, and the "amplitude" is the difference between the maximum and the minimum value for the particular digitized signal. The constant 127 is chosen so the final position signal will span the range of a signed 8-bit number, i.e., the final position signal will range between −127 and 127. The maximum and minimum values for both digitized signals are found during a search that is performed during the power-up sequence and periodically thereafter when the encoder can be rotated without interfering with normal machine operation. FIG. 11 illustrates in analog form the results of this process being performed at every point along the two digitized signals.

The signals of FIG. 11 are then modified such that the slopes of the two modified versions of the waveforms always have the same sign. In the embodiment shown, the waveforms are modified such that their slopes are always positive (i.e., increasing angular position results in increasing signal strength). The phase information captured in status register 100 is used to determine in which quadrant the data point lies. The sign of the data is changed if it lies in either of two particular quadrants. More particularly, viewing FIG. 11, for the angular positions of code wheel 24 at which normalized signal Enc $B_n$ is positive, the sign of the normalized signal Enc $A_n$ is reversed. Further, for the angular positions of code wheel 24 at which the signal Enc $A_n$ is negative, the sign of signal Enc $B_n$ is reversed. This has the effect of converting all the slopes of the waveforms to the same sign without changing the magnitudes of the slopes.

Figure 12:
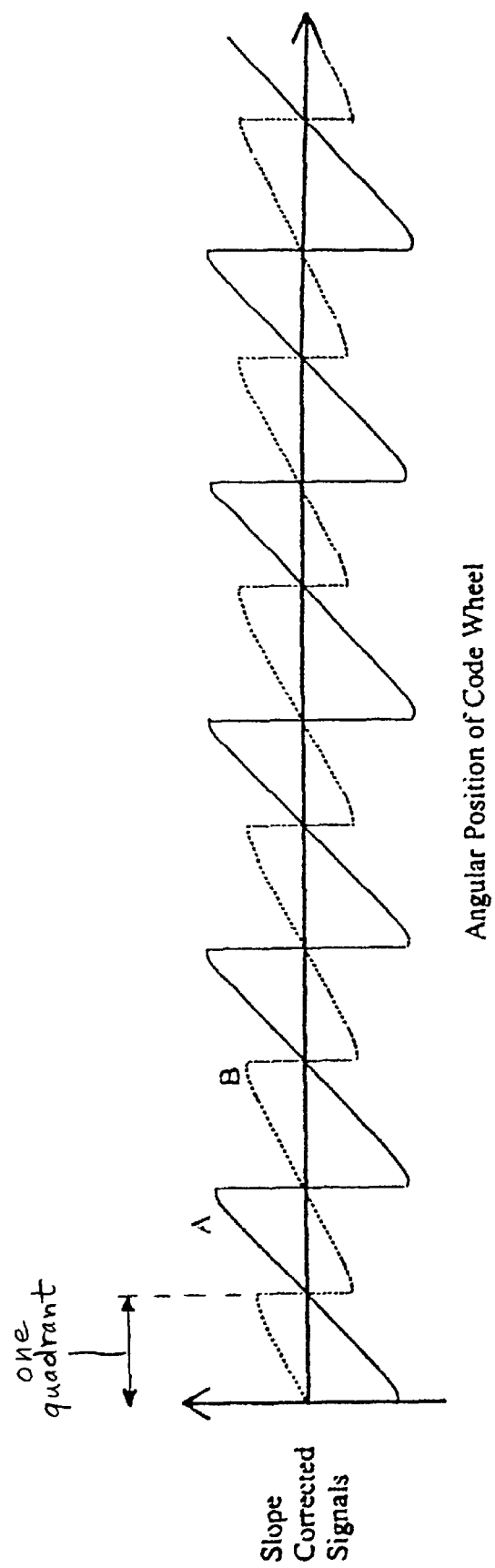
FIG. 12 is a plot of slope corrected versions of the encoder signals of FIG. 11.

FIG. 12 illustrates the results of this operation being performed for every position of code wheel 24, to form slope corrected signals A and B.

As can be seen in FIG. 12, there are flat spots at the top and bottom extremes of each of the waveforms of the slope corrected signals A and B. No matter what the wave shape, there will inevitably be flat spots at the top and bottom extremes of the wave. Such flat spots reduce the ability to resolve positional differences in these areas.

Figure 13:
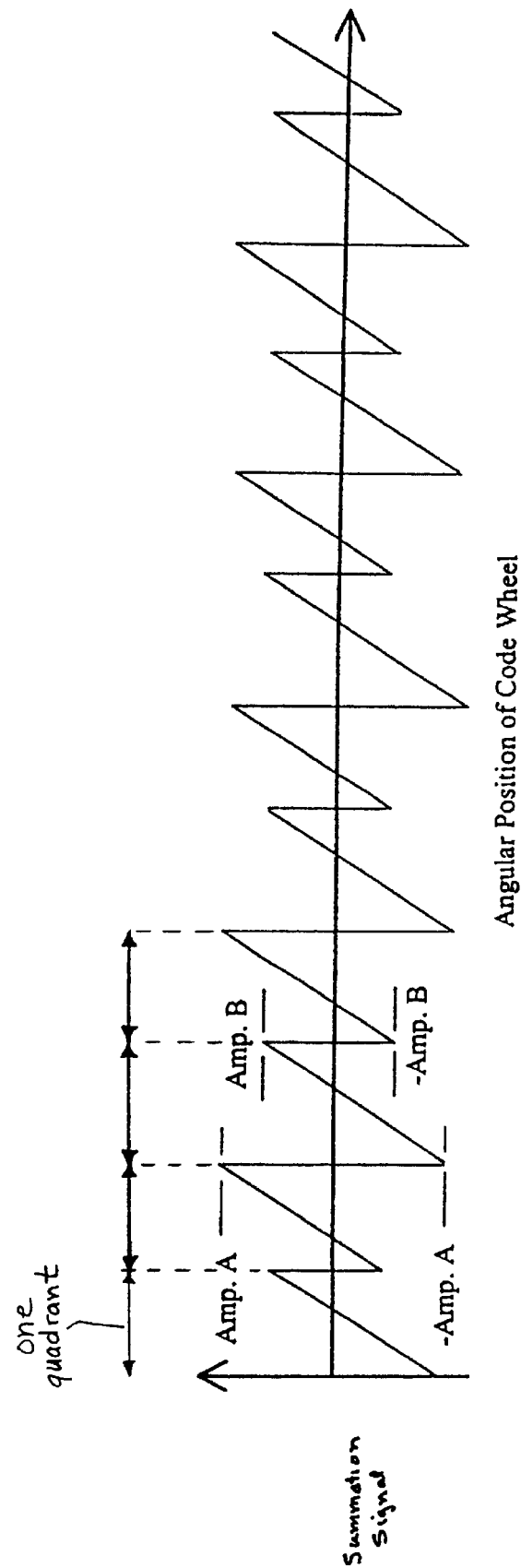
FIG. 13 is a plot of the sum of the slope corrected encoder signals of FIG. 12.

In order to alleviate the flat spots, the waveforms of slope corrected signals A and B are added together, with the resulting summation signal being shown in FIG. 13. With some wave shapes, like sinusoidal, this helps linearize the signals since the slope of one channel is steepest where the slope of the other is flattest. Adding the waves together assures that a measurable slope exists at every point in the wave, improving the ability to resolve small positional differences over the whole quadrant.

As indicated in FIG. 13, the amplitudes of the peaks (local maximums and local minimums) are either +/− the amplitude of normalized signal Enc $A_n$ or +/− the amplitude of normalized signal Enc $B_n$. The reason for this is that since the waves are in perfect quadrature, one wave is at its peak when the other is zero. A linear segment interconnects each local minimum with an adjacent local maximum.

The quadrants are then selectively shifted up (FIG. 14) or down (FIG. 15) by adding or subtracting the amplitude of signal Enc $A_n$ or the amplitude of signal Enc $B_n$ depending upon the quadrant and the direction of rotation of shaft 30. More particularly, if shaft 30 is rotating in a forward direction, and both signals Enc $A_n$ and Enc $B_n$ are negative, as shown in the first quadrant of FIG. 11, then the amplitude of the signal Enc $A_n$ is added to the waveform of FIG. 13, thereby "shifting up" the waveform, as shown in the first quadrant of FIG. 14. If, however, signal Enc $A_n$ is positive and signal Enc $B_n$ is negative, as shown in the second quadrant of FIG. 11, then the amplitude of signal Enc $B_n$ is added to the waveform of FIG. 13, as shown in the second quadrant of FIG. 14. If both signals Enc $A_n$ and Enc $B_n$ are positive, as shown in the third quadrant of FIG. 11, then the amplitude of signal Enc $A_n$ is added to the waveform of FIG. 13, as shown in the third quadrant of FIG. 14. Finally, if signal Enc $A_n$ is negative and signal Enc $B_n$ is positive, as shown in the fourth quadrant of FIG. 11, then the amplitude of signal Enc $B_n$ is added to the waveform of FIG. 13, as shown in the fourth quadrant of FIG. 14. The resulting modified summation signal is a periodic sawtooth type of waveform, with each sawtooth having an equal minimum value and an equal maximum value joined by a shifted linear segment.

Figure 15:
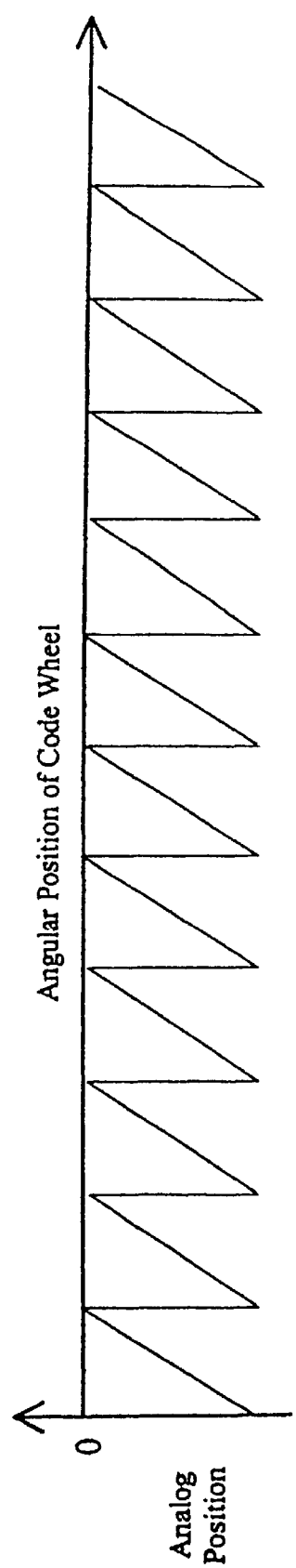
FIG. 15 is a plot of an amplitude shifted version of the waveform of FIG. 13 with the code wheel of FIG. 5 rotating in a backward direction.

Conversely, if shaft 30 is rotating in a backward direction, and both signals Enc $A_n$ and Enc $B_n$ are negative, as shown in the first quadrant of FIG. 11, or both signals Enc $A_n$ and Enc $B_n$ are positive, as shown in the third quadrant of FIG. 11, then the amplitude of signal Enc $B_n$ is subtracted from the waveform of FIG. 13, thereby "shifting down" the waveform, as shown in the first and third quadrants of FIG. 15. If, however, signal Enc $A_n$ is positive and signal Enc $B_n$ is negative, as shown in the second quadrant of FIG. 11, or if signal Enc $A_n$ is negative and signal Enc $B_n$ is positive, as shown in the fourth quadrant of FIG. 11, then the amplitude of signal Enc $A_n$ is subtracted from the waveform of FIG. 13, as shown in the second and fourth quadrants of FIG. 15.

Figure 14:
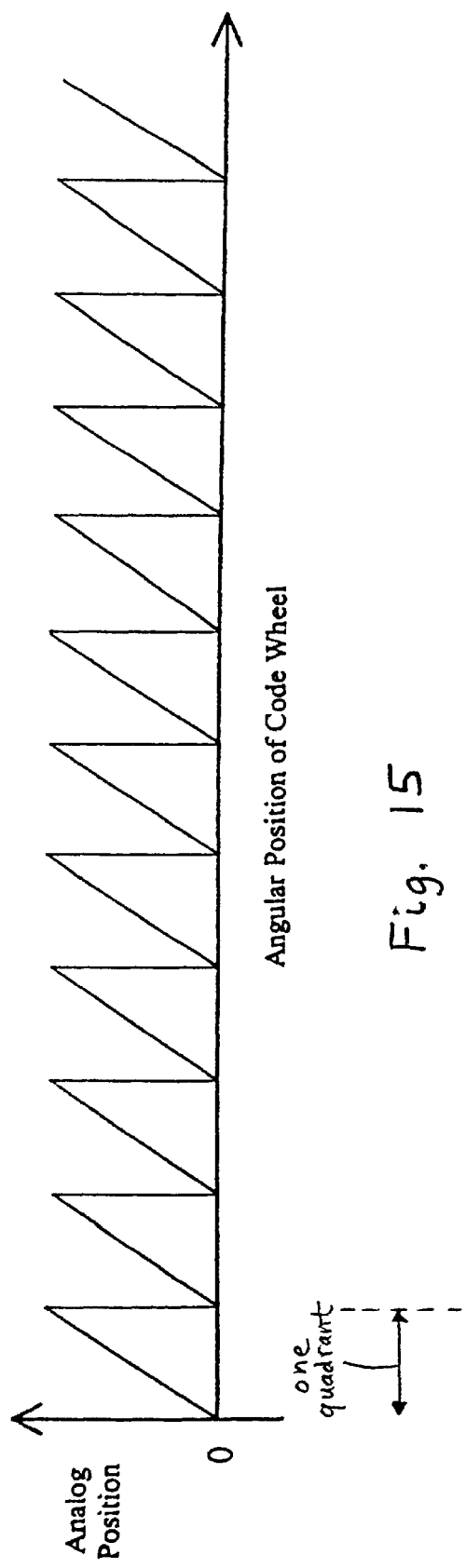
FIG. 14 is a plot of an amplitude shifted version of the waveform of FIG. 13 with the code wheel of FIG. 5 rotating in a forward direction.

The points at which the waveforms of FIGS. 14 and 15 have a value of zero, i.e., at the end of each cycle or quadrant, are the points where digital counter 94 increments. Changing direction results in a smooth transition from one waveform to the other. The digital counter does not update as the analog signal passes through zero.

In the embodiment discussed above, the analog position signal and the modified summation signals are signed 8-bit numbers. At a selected point in time, a value of the modified summation signal is determined. The final position of shaft 30 at the selected point in time is calculated based upon combining the value of the modified summation signal (fine resolution) of FIGS. 14 and 15 with the digital count (coarse resolution) read from index relative register 96. The value of the modified summation signal is added to the digital position multiplied by 256. The position resolution is then $1/127$ of a quadrant or 508 times the encoder period. Assuming that there are 2000 opaque radial lines 32 or "windows" in a single code wheel 24, the encoder of the present invention can detect over one million positions (508×2000) within one rotation of code wheel 24.

Ultimately the achievable resolution is determined by encoder linearity and stability, noise in the system, resolution of analog-to-digital converters 70, 72, and the size of the data elements handled by microprocessor 60.

Figure 16:
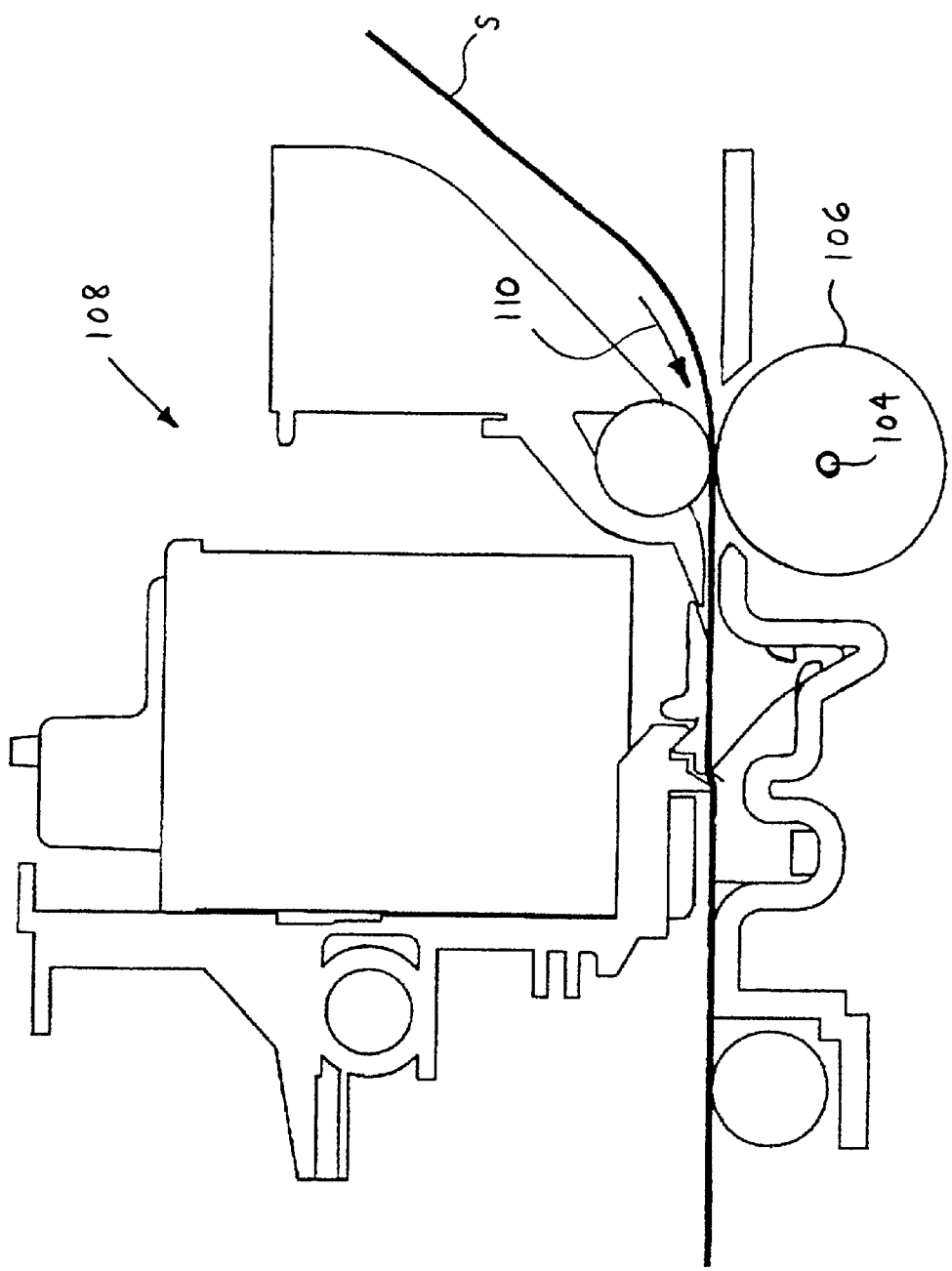
FIG. 16 is a side, sectional view of the rotating shaft of FIG. 5 being used to drive a feed roll of an imaging apparatus.

One possible application of the optical encoder system of the present invention is to determine the position of a feed shaft 104 (FIG. 16) which carries a feed roll 106 used in an imaging apparatus, such as an ink jet printer 108. Feed roll 106 carries sheet S such that a rotational position of feed shaft 104 has a predetermined relationship with the feed position of sheet S relative to the feed direction indicated by arrow 110. The print quality of a printer is often highly dependent upon precise control of the position of a print medium, such as sheet S.

It is possible for the normalization to occur after the summation signal has been formed. Given that the sum of the amplitudes of signal Enc A and signal Enc B is in the denominator of the normalization formula described above, it would probably be more intuitive to do so. However, performing the normalization before the two signals are added together ensures that the maximum value of the summation signal does not exceed the maximum value which can be stored in a predetermined number of bits, e.g., eight bits, that are reserved in microprocessor 60 for a value of the summation signal.

The method and apparatus of the present invention have been described herein in conjunction with one type of optical encoder. However, it is to be understood that the present invention is applicable as well to many other varieties and configurations of encoders. For example, the optical encoders described herein include masks. However, the present invention can also be used with an encoder that includes a retical instead of a mask. Also, sample and hold circuits could be used in place of track and hold circuits 66, 68.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of determining a feed position of a print medium in an imaging apparatus, said method comprising the steps of:

providing a feed roll with a central feed shaft, said feed roll carrying the print medium such that each of a plurality of rotational positions of said feed shaft has a predetermined relationship with the feed position of the print medium;

connecting an encoder device to said feed shaft, said encoder device producing a first periodic signal and a second periodic signal, each said periodic signal being a function of said rotational position of said feed shaft, each period of each said signal corresponding to a predetermined rotational distance of said feed shaft, said two signals being approximately 90 degrees out of phase with each other;

creating a modified first signal based upon said first periodic signal, a slope of said modified first signal having a same sign at each said rotational position of said feed shaft, a magnitude of said slope of said modified first signal being equal to a magnitude of a slope of said unmodified first signal at each said rotational position of said feed shaft;

creating a modified second signal based upon said second periodic signal, a slope of said modified second signal having said same sign at each said rotational position of said feed shaft, a magnitude of said slope of said modified second signal being equal to a magnitude of a slope of said unmodified second signal at each said rotational position of said feed shaft;

adding said modified first signal to said modified second signal to thereby create a summation signal, said summation signal having a plurality of local minimum values, a plurality of local maximum values, and a plurality of substantially linear segments, each said linear segment interconnecting a corresponding said local minimum value with an adjacent said local maximum value;

creating a periodic modified summation signal by adding a corresponding constant value to each said linear segment to thereby create a plurality of shifted linear segments such that each said shifted linear segment extends between a substantially equal minimum value and a substantially equal maximum value, each said shifted linear segment representing one cycle of a plurality of cycles of said periodic modified summation signal;

determining a value of said modified summation signal at a selected point in time;

counting a number of completed said cycles of said modified summation signal at said value at said selected point in time; and calculating the feed position of the print medium based upon said number of completed cycles counted and said determined value of said modified summation signal.

2. The method of claim 1, comprising the further step of using said first signal and said second signal to determine a direction of rotation of said feed shaft.

3. The method of claim 2, wherein each said corresponding constant value added to each said linear segment is dependent upon the direction of rotation of said feed shaft.

4. The method of claim 3, wherein each of said first signal and said second signal has an average over each said period, said average being approximately zero, said step of creating a modified first signal includes changing a sign of said first signal dependent upon a sign of said second signal, said step of creating a modified second signal including changing said sign of said second signal dependent upon said sign of said first signal.

5. The method of claim 4, wherein each said corresponding constant value added to each said linear segment is one of an amplitude of said first signal and an amplitude of said second signal if said feed shaft has a first said direction of rotation, each said corresponding constant value being a negative value with a magnitude equal to one of said amplitude of said first signal and said amplitude of said second signal if said feed shaft has a second said direction of rotation opposite to said first direction of rotation.

6. The method of claim 5, wherein each said shifted linear segment extends between zero and a sum of said amplitudes of said first signal and said second signal if said feed shaft has said first direction of rotation, each said shifted linear segment extending between zero and a negative value with a magnitude equal to said sum of said amplitudes of said first signal and said second signal if said feed shaft has said second direction of rotation.

7. The method of claim 1, wherein said encoder device produces a third periodic signal having a frequency equal to a rotational frequency of said feed shaft.

8. The method of claim 1, comprising the further step of normalizing each of said first periodic signal and said second periodic signal.

9. The method of claim 1, wherein said same sign of said slopes of said modified first signal and of said modified second signal comprises one of positive and negative.

10. The method of claim 1, wherein a period of said modified summation signal is approximately one-fourth of said period of said first signal and approximately one-fourth of said period of said second signal.

11. The method of claim 1, wherein said counting step includes:

converting each of said unmodified first signal and said unmodified second signal to respective square wave signals by comparing each said unmodified signal to a reference value;

transmitting a pulse upon each rising edge and upon each falling edge of said two square wave signals; and counting said pulses.

12. The method of claim 11, comprising the further step of determining a direction of rotation of said feed shaft based upon a relationship between said two square wave signals.

13. A method of determining one of a plurality of rotational positions of a rotating shaft, said method comprising the steps of:

connecting an encoder device to said shaft, said encoder device producing a first periodic signal and a second periodic signal, each said periodic signal being a function of said rotational position of said shaft, each period of each said signal corresponding to a predetermined rotational distance of said shaft, said two signals being approximately 90 degrees out of phase with each other;

creating a modified first signal based upon said first periodic signal, a slope of said modified first signal having a same sign at each said rotational position of said shaft, a magnitude of said slope of said modified first signal being equal to a magnitude of a slope of said unmodified first signal at each said rotational position of said shaft;

creating a modified second signal based upon said second periodic signal, a slope of said modified second signal having said same sign at each said rotational position of said shaft, a magnitude of said slope of said modified second signal being equal to a magnitude of a slope of said unmodified second signal at each said rotational position of said shaft;

adding said modified first signal to said modified second signal to thereby create a summation signal, said summation signal having a plurality of local minimum values, a plurality of local maximum values, and a plurality of substantially linear segments, each said linear segment interconnecting a corresponding said local minimum value with an adjacent said local maximum value;

creating a periodic modified summation signal by adding a corresponding constant value to each said linear segment to thereby create a plurality of shifted linear segments such that each said shifted linear segment extends between a substantially equal minimum value and a substantially equal maximum value, each said shifted linear segment representing one cycle of a plurality of cycles of said periodic modified summation signal;

determining a value of said modified summation signal at a selected point in time;

counting a number of completed said cycles of said modified summation signal at said value at said selected point in time; and calculating the rotational position of the shaft based upon said number of completed cycles counted and said determined value of said modified summation signal.

14. A method of linearizing a first periodic output signal and a second periodic output signal of an analog encoder, said two signals being approximately 90 degrees out of phase with each other, each said signal being a function of a plurality of rotational positions of a rotating shaft, said method comprising the steps of:

creating a modified first signal based upon said first periodic output signal, a slope of said modified first signal having a same sign at each said rotational position of said shaft, a magnitude of said slope of said modified first signal being equal to a magnitude of a slope of said unmodified first signal at each said rotational position of said shaft;

creating a modified second signal based upon said second periodic output signal, a slope of said modified second signal having said same sign at each said rotational position of said shaft, a magnitude of said slope of said modified second signal being equal to a magnitude of a slope of said unmodified second signal at each said rotational position of said shaft; and adding said modified first signal to said modified second signal to thereby create a summation signal, said summation signal having a plurality of local minimum values, a plurality of local maximum values, and a plurality of substantially linear segments, each said linear segment interconnecting a corresponding said local minimum value with an adjacent said local maximum value.

15. The method of claim 14, comprising the further step of creating a periodic modified summation signal by adding a corresponding constant value to each said linear segment to thereby create a plurality of shifted linear segments such that each said shifted linear segment extends between a substantially equal minimum value and a substantially equal maximum value, each said shifted linear segment representing one cycle of a plurality of cycles of said periodic modified summation signal.

16. An apparatus for determining a feed position of a print medium in an imaging device, said apparatus comprising:

a feed roll with a central feed shaft, said feed roll being configured for carrying the print medium such that each of a plurality of rotational positions of said feed shaft has a predetermined relationship with the feed position of the print medium;

an encoder device connected to said shaft, said encoder device producing a first periodic signal and a second periodic signal, each said periodic signal being a function of said rotational position of said shaft, each period of each said signal corresponding to a predetermined rotational distance of said shaft, said two signals being approximately 90 degrees out of phase with each other;

means for creating a modified first signal based upon said first periodic signal, a slope of said modified first signal having a same sign at each said rotational position of said shaft, a magnitude of said slope of said modified first signal being equal to a magnitude of a slope of said unmodified first signal at each said rotational position of said shaft;

means for creating a modified second signal based upon said second periodic signal, a slope of said modified second signal having said same sign at each said rotational position of said shaft, a magnitude of said slope of said modified second signal being equal to a magnitude of a slope of said unmodified second signal at each said rotational position of said shaft;

means for adding said modified first signal to said modified second signal to thereby create a summation signal, said summation signal having a plurality of local minimum values, a plurality of local maximum values, and a plurality of substantially linear segments, each said linear segment interconnecting a corresponding said local minimum value with an adjacent said local maximum value;

means for creating a periodic modified summation signal by adding a corresponding constant value to each said linear segment to thereby create a plurality of shifted linear segments such that each said shifted linear segment extends between a substantially equal minimum value and a substantially equal maximum value, each said shifted linear segment representing one cycle of a plurality of cycles of said periodic modified summation signal;

means for determining a value of said modified summation signal at a selected point in time;

means for counting a number of completed said cycles of said modified summation signal at said value at said selected point in time; and means for calculating the feed position of the print medium based upon said number of completed cycles counted and said determined value of said modified summation signal.

17. An apparatus for determining one of a plurality of rotational positions of a rotating shaft, said apparatus comprising:

an encoder device configured for being connected to said shaft, said encoder device producing a first periodic signal and a second periodic signal, each said periodic signal being a function of said rotational position of said shaft, each period of each said signal corresponding to a predetermined rotational distance of said shaft, said two signals being approximately 90 degrees out of phase with each other;

means for creating a modified first signal based upon said first periodic signal, a slope of said modified first signal having a same sign at each said rotational position of said shaft, a magnitude of said slope of said modified first signal being equal to a magnitude of a slope of said unmodified first signal at each said rotational position of said shaft;

means for creating a modified second signal based upon said second periodic signal, a slope of said modified second signal having said same sign at each said rotational position of said shaft, a magnitude of said slope of said modified second signal being equal to a magnitude of a slope of said unmodified second signal at each said rotational position of said shaft;

means for adding said modified first signal to said modified second signal to thereby create a summation signal, said summation signal having a plurality of local minimum values, a plurality of local maximum values, and a plurality of substantially linear segments, each said linear segment interconnecting a corresponding said local minimum value with an adjacent said local maximum value;

means for creating a periodic modified summation signal by adding a corresponding constant value to each said linear segment to thereby create a plurality of shifted linear segments such that each said shifted linear segment extends between a substantially equal minimum value and a substantially equal maximum value, each said shifted linear segment representing one cycle of a plurality of cycles of said periodic modified summation signal;

means for determining a value of said modified summation signal at a selected point in time;

means for counting a number of completed said cycles of said modified summation signal at said value at said selected point in time; and means for calculating the rotational position of the shaft based upon said number of completed cycles counted and said determined value of said modified summation signal.

18. The apparatus of claim 17, wherein said encoder device comprises an optical encoder.

19. The apparatus of claim 18, wherein said optical encoder includes: a code wheel configured for being attached to the shaft;

at least one light source disposed to one side of said code wheel; and at least two light detectors disposed to an opposite side of said code wheel.

20. The apparatus of claim 19, wherein said optical encoder also includes a mask disposed between said code wheel and said at least two light detectors.

* * * * *